United States Patent
Brothers et al.

(10) Patent No.: US 9,732,212 B2
(45) Date of Patent: *Aug. 15, 2017

(54) AQUEOUS POLYMERIZATION OF FLUORINATED MONOMER USING A MIXTURE OF FLUOROPOLYETHER ACIDS OR SALTS

(71) Applicant: THE CHEMOURS COMPANY FC LLC, Wilmington, DE (US)

(72) Inventors: Paul Douglas Brothers, Chadds Ford, PA (US); Subhash Vishnu Gangal, Hockessin, DE (US); Gregory Allen Chapman, Washington, WV (US); Jon Lee Howell, Bear, DE (US); Adam Paul Smith, Vienna, WV (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,678

(22) Filed: Feb. 20, 2015

(65) Prior Publication Data

US 2015/0159004 A1 Jun. 11, 2015

Related U.S. Application Data

(63) Continuation of application No. 13/850,475, filed on Mar. 26, 2013, now abandoned, which is a
(Continued)

(51) Int. Cl.
*C08L 27/18* (2006.01)
*C08F 6/16* (2006.01)
(Continued)

(52) U.S. Cl.
CPC ............... *C08L 27/18* (2013.01); *C08F 6/16* (2013.01); *C08F 14/18* (2013.01); *C08F 114/26* (2013.01);
(Continued)

(58) Field of Classification Search
CPC . C08L 27/12; C08F 14/18; C08F 2/16; C08K 5/095
See application file for complete search history.

(56) References Cited

U.S. PATENT DOCUMENTS 2,559,752 A 7/1951 Berry
2,713,593 A 7/1955 Brice et al.
(Continued)

FOREIGN PATENT DOCUMENTS

EP 0 250 767 B1 9/1991
EP 0 148 482 B1 3/1992
(Continued)

OTHER PUBLICATIONS

Solvay Fluorolink Data sheet. Submitted by applicant for Dec. 6, 2016 Interview. Dated Dec. 13, 2002, No Author.*
(Continued)

*Primary Examiner* — Michael A Salvitti

(57) ABSTRACT

A composition comprising a mixture of fluoropolyether acids or salts having a number average value of about 800 to about 2500 g/mol. The amount of fluoropolyether acids or salt in the mixture having a molecular weight of not more than 500 g/mol is not more than 50 ppm by weight of the total amount of fluoropolyether acids or salts in the mixture. The amount of fluoropolyether acids or salts in the mixture having a molecular weight of 2500 g/mol or greater is not more than 40% by weight of the total amount of fluoropolyether acids or salts in the mixture. Preferably the fluoropolyether acids or salts comprise an anionic group selected from the group consisting of carboxylate, sulfonate, sulfonamide anion and phosphonate. Also disclosed is an aqueous dispersion polymerization process for fluoropolymer manufacture employing polymerization agent comprising the specified mixture of fluoropolyether acids or salts.

10 Claims, 1 Drawing Sheet

Related U.S. Application Data continuation of application No. 13/230,885, filed on Sep. 13, 2011, now abandoned, which is a continuation of application No. 12/436,280, filed on May 6, 2009, now abandoned.

(60) Provisional application No. 61/051,924, filed on May 9, 2008.

(51) Int. Cl.

| | | |
|---|---|---|
| C08F 14/18 | (2006.01) | |
| C08F 214/18 | (2006.01) | |
| C08G 65/00 | (2006.01) | |
| C08K 5/095 | (2006.01) | |
| C08L 71/02 | (2006.01) | |
| C08F 114/26 | (2006.01) | |
| C08F 216/14 | (2006.01) | |
| C08J 3/16 | (2006.01) | |

(52) U.S. Cl.
CPC ...... *C08F 214/18* (2013.01); *C08F 216/1408* (2013.01); *C08G 65/007* (2013.01); *C08J 3/16* (2013.01); *C08K 5/095* (2013.01); *C08L 71/02* (2013.01); *C08G 2650/48* (2013.01); *C08J 2327/18* (2013.01); *C08L 2201/54* (2013.01)

(56) References Cited

U.S. PATENT DOCUMENTS

| | | | |
|---|---|---|---|
| 3,271,341 A | 9/1966 | Garrison, Jr. | |
| 3,291,843 A | 12/1966 | Fritz et al. | |
| 3,391,099 A | 7/1968 | Punderson | |
| 3,839,425 A | 10/1974 | Bartlett | |
| 4,036,802 A | 7/1977 | Poirier | |
| 4,358,545 A | 11/1982 | Ezzell et al. | |
| 4,380,618 A | 4/1983 | Khan et al. | |
| 4,381,384 A | 4/1983 | Khan | |
| 4,552,631 A | 11/1985 | Bissot et al. | |
| 4,621,116 A | 11/1986 | Morgan | |
| 4,769,184 A * | 9/1988 | Okabe et al. | 562/849 |
| 4,864,006 A | 9/1989 | Giannetti et al. | |
| 5,285,002 A | 2/1994 | Grootaert | |
| 5,637,748 A | 6/1997 | Hung et al. | |
| 5,688,884 A | 11/1997 | Baker et al. | |
| 5,763,552 A | 6/1998 | Feiring et al. | |
| 5,789,508 A | 8/1998 | Baker et al. | |
| 5,925,705 A | 7/1999 | Araki et al. | |
| 6,177,196 B1 | 1/2001 | Brothers et al. | |
| 6,300,445 B1 | 10/2001 | Hung et al. | |
| 6,395,848 B1 * | 5/2002 | Morgan et al. | 526/214 |
| 6,429,258 B1 * | 8/2002 | Morgan et al. | 524/805 |
| 6,632,508 B1 * | 10/2003 | Pellerite et al. | 428/142 |
| 6,841,616 B2 | 1/2005 | Wille et al. | |
| 7,141,537 B2 | 11/2006 | Audenaert et al. | |
| 7,705,074 B2 | 4/2010 | Brothers et al. | |
| 7,709,566 B2 | 5/2010 | Hoshikawa et al. | |
| 7,851,573 B2 | 12/2010 | Higuchi et al. | |
| 7,855,259 B2 | 12/2010 | Funaki et al. | |
| 7,897,682 B2 | 3/2011 | Brothers et al. | |
| 7,932,333 B2 | 4/2011 | Brothers et al. | |
| 7,968,625 B2 * | 6/2011 | Sawauchi et al. | 523/332 |
| 7,977,438 B2 * | 7/2011 | Brothers et al. | 526/194 |
| 8,519,072 B2 | 8/2013 | Brothers et al. | |
| 2003/0161962 A1 * | 8/2003 | Lines et al. | 427/387 |
| 2004/0072977 A1 | 4/2004 | Kaulbach et al. | |
| 2005/0090613 A1 | 4/2005 | Maruya et al. | |
| 2005/0096244 A1 * | 5/2005 | Audenaert et al. | 510/356 |
| 2006/0205982 A1 | 9/2006 | Marchionni et al. | |
| 2006/0281946 A1 | 12/2006 | Morita et al. | |
| 2007/0015864 A1 | 1/2007 | Hintzer et al. | |
| 2007/0015865 A1 | 1/2007 | Hintzer et al. | |
| 2007/0015866 A1 | 1/2007 | Hintzer et al. | |
| 2007/0015937 A1 | 1/2007 | Hintzer et al. | |
| 2007/0123430 A1 * | 5/2007 | Pasquier et al. | 507/136 |
| 2007/0142541 A1 | 6/2007 | Hintzer et al. | |
| 2008/0207859 A1 | 8/2008 | Matsuoka et al. | |
| 2008/0269408 A1 * | 10/2008 | Brothers et al. | 524/599 |
| 2010/0152363 A1 | 6/2010 | Brothers et al. | |
| 2010/0152378 A1 | 6/2010 | Brothers et al. | |
| 2010/0152379 A1 | 6/2010 | Brothers et al. | |
| 2011/0251317 A1 | 10/2011 | Brothers et al. | |
| 2012/0004365 A1 * | 1/2012 | Brothers et al. | 524/757 |
| 2012/0077931 A1 | 3/2012 | Brothers et al. | |
| 2013/0217849 A1 | 8/2013 | Brothers et al. | |
| 2013/0331516 A1 | 12/2013 | Brothers et al. | |

FOREIGN PATENT DOCUMENTS

| | | |
|---|---|---|
| EP | 1 679 352 A2 | 7/2006 |
| EP | 1 334 996 B1 | 11/2008 |
| GB | 1 292 268 A | 10/1972 |
| JP | 2003119204 A | 4/2003 |
| JP | 2004358397 A | 12/2004 |
| JP | 2004359870 A | 12/2004 |
| WO | 99/37720 A1 | 7/1999 |
| WO | 00/71590 A1 | 11/2000 |
| WO | 01/46116 A1 | 6/2001 |
| WO | 0230848 A1 | 4/2002 |
| WO | 2008/060460 A1 | 5/2008 |
| WO | 2008/060461 A1 | 5/2008 |
| WO | 2008/060462 A1 | 5/2008 |
| WO | 2008/060463 A1 | 5/2008 |

OTHER PUBLICATIONS

Kasai, "Perfluoropolyethers With Acid End Groups: Amphiphilicity and Emulsification", Journal of Applied Science, vol. 57, 1995, pp. 797-809.

* cited by examiner

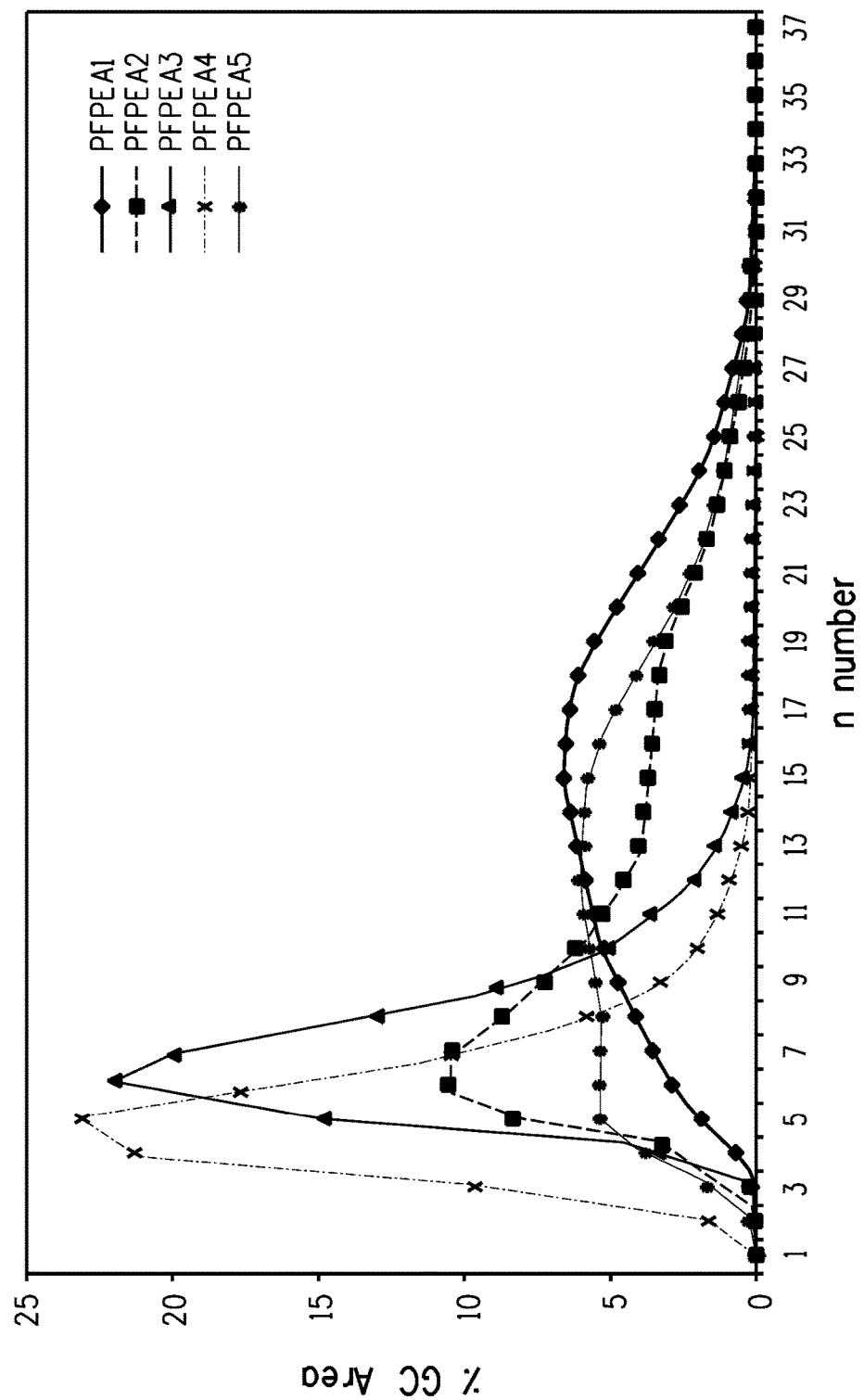

AQUEOUS POLYMERIZATION OF FLUORINATED MONOMER USING A MIXTURE OF FLUOROPOLYETHER ACIDS OR SALTS

FIELD OF THE INVENTION

This invention relates to a composition comprising a mixture of fluoropolyether acids or salts and a process for the dispersion polymerization of fluorinated monomer in an aqueous polymerization medium employing a polymerization agent comprising the mixture of fluoropolyether acid or salt.

BACKGROUND OF THE INVENTION

A typical process for the aqueous dispersion polymerization of fluorinated monomer includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processable TFE copolymers, to control melt viscosity. After several hours, the feeds are stopped, the reactor is vented and purged with nitrogen, and the raw dispersion in the vessel is transferred to a cooling vessel.

For use in fluoropolymer coatings for metals, glass and fabric, polymer dispersion is typically transferred to a dispersion concentration operation which produces stabilized dispersions used as coatings. Certain grades of PTFE dispersion are made for the production of fine powder. For this use, the polymer dispersion is coagulated, the aqueous medium is removed and the PTFE is dried to produce fine powder. Dispersions of melt-processable fluoropolymers for molding resin are also coagulated and the coagulated polymer dried and then processed into a convenient form such as flake, chip or pellet for use in subsequent melt-processing operations.

As described in U.S. Pat. No. 3,391,099 to Punderson, dispersion polymerization involves two generally distinct phases. The initial period of the reaction is a nucleation phase in which a given number of polymerization sites or nuclei are established. Subsequently, there occurs a growth phase in which polymerization of fluorinated monomer on established particles occurs with little or no formation of new particles. Successful production of the high solids fluoropolymer dispersion generally requires the presence of the fluorosurfactant, especially in the later growth phase of polymerization in order to stabilize the dispersion preventing coagulation of the fluoropolymer particles.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry, specifically perfluorooctanoic acid and salts, often referred to as C8, and perfluorononanoic acid and salts, often referred to as C9. Because of recent environmental concerns with regard to perfluorooctanoic acid and salts, there is interest in reducing or eliminating perfluorooctanoic acid and salts in fluoropolymer polymerization processes.

High molecular weight materials such as fluoropolyethers have been used in the polymerization of fluoromonomers. U.S. Pat. No. 4,864,006 to Gianetti et al. discloses the polymerization of fluorinated monomers in the presence of a perfluoropolyether having neutral end groups, perfluoropolyether oil, which is used in the form of an aqueous microemulsion. The perfluoropolyether oil has a molecular weight of at least about 500 and the aqueous microemulsion of the oil is prepared using a suitable surfactant which can be selected from known perfluorinated carboxylic or sulfonic acids or from perfluoropolyethers having one or two acid end groups. U.S. Pat. No. 3,271,341 to Garrison discloses a process that uses perfluoropolyether carboxylic acid or salt as dispersing agents in the aqueous polymerization of fluoromonomers. U.S. Pat. No. 6,395,848 to Morgan et al. discloses an improved process for the aqueous dispersion polymerization of fluorinated monomers using a combination of fluorosurfactants, which can be a fluoroalkyl carboxylic or sulfonic acid or salt thereof or fluoroalkoxy aryl sulfonic acid or salt thereof, and perfluoropolyether carboxylic or sulfonic acid or salt thereof. U.S. Pat. No. 7,141,537 to Audenaert et al. also discloses mixtures of fluorinated polyether surfactants and their use as an emulsifying agent or stabilizer in dispersion polymerization.

U.S. Pat. No. 3,271,341 to Garrison focuses on the use of a number of individual perfluoroether dispersing agents of varying degree of polymerization where n is a value of the number of repeating ether units and is disclosed as 0 to 10. Such dispersing agents are produced from the polymerization of tetrafluoroethylene oxide or hexafluoropropylene oxide by contacting the oxide with a typical free radical-forming catalyst which results in a perfluoropolyether carbonyl fluoride which is converted into an acid, ester or alcohol. The reaction product of the polymerization of hexafluoropropylene oxide is a mixture of perfluoropolyether acids or salts of varying degree of polymerization containing in one specific example, a broad molecular weight distribution of about 12% of a fraction of n=0 (MW of about 330 g/mol), about 5% of a fraction of n=1 (MW of about 500 g/mol), about 50% of a fraction of n=2-35 (MW of from about 660 g/mol to about 6140 g/mol) and about 8% of a fraction n>35 (MW of above about 6140 g/mol). Isolated individual acids from this mixture are used in polymerization in Garrison's Examples.

U.S. Pat. No. 6,395,848 (Morgan et al.) illustrates the use of mixtures of perfluoropolyether acids or salts having a broad range of molecular weight fractions characterized by number average molecular weights ranging from 2000 to 7500 g/mol, for example Krytox® FSL 157 with number average molecular weight of 2500 g/mol and Krytox® FSH 157 with number average molecular weight of 7000-7500 g/mol. U.S. Pat. No. 7,141,537 to Audenaert et al. illustrates perfluoropolyether surfactants having a broad range of molecular weight fractions characterized by weight average molecular weights of from 750 g/mol to 5000 g/mol. Fluoropolyether acids or salts with broad molecular weight ranges including high molecular weight fractions can result in residual high molecular weight fluoropolyether acids or salts and/or by-products in the resulting fluoropolymer which may be undesirable for some end uses.

It would be desirable to have an improved mixture of fluoropolyether acids or salts thereof which is particularly useful for commercial fluoropolymer manufacture and which controls residual fluoropolyether acids or salts and by-products in the resulting polymer product.

SUMMARY OF THE INVENTION

The invention is based on the discovery that a mixture of fluoropolyether acids or salts of varying degree of polymerization and containing specified limits on the amounts of both low and high molecular weight fractions can be used to polymerize fluoromonomers efficiently. Efficiency is observed as being able to produce the same or improved fluoropolymer dispersions while using less fluoropolyether acid or salt mixture when compared to a commercially available fluoropolyether acid or salt mixture. In addition, with the use of a mixture of fluoropolyether acids or salts of this invention, there is the ability to control residual fluoropolyether acids or salts and by-products in the resulting fluoropolymer.

The invention relates to a composition comprising a mixture of fluoropolyether acids or salts having a number average value of about 800 to about 2500 g/mol. The amount of fluoropolyether acids or salt in the mixture having a molecular weight of not more than 500 g/mol is not more than 50 ppm by weight of the total amount of fluoropolyether acids or salts in the mixture. The amount of fluoropolyether acids or salts in the mixture having a molecular weight of 2500 g/mol or greater is not more than 40% by weight of the total amount of fluoropolyether acids or salts in the mixture. Preferably the fluoropolyether acids or salts comprise an anionic group selected from the group consisting of carboxylate, sulfonate, sulfonamide anion and phosphonate.

The invention further relates to a composition comprising a mixture of perfluoropolyether acids or salts of the formula:

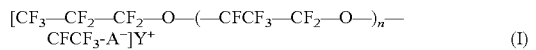

[CF$_3$—CF$_2$—CF$_2$—O—(—CFCF$_3$—CF$_2$—O—)$_n$—CFCF$_3$-A$^-$]Y$^+$     (I)

wherein A$^-$ is an anionic group selected from the group consisting of carboxylate, sulfonate, sulfonamide anion, and phosphonate; Y$^+$ is hydrogen, ammonium or alkali metal cation; wherein n is at least 1 and has an average value of about 3 to about 13; the amount of perfluoropolyether in the mixture wherein n is 1 is not more than 50 ppm by weight of the total amount of perfluoropolyethers in the mixture; and the amount of perfluoropolyethers in the mixture wherein n is 13 or greater is not more than 40% by weight of the total amount of perfluoropolyethers in the mixture.

The invention further relates to a process comprising polymerizing at least one fluorinated monomer in an aqueous medium containing initiator and polymerization agent to form an aqueous dispersion of fluoropolymer particles, wherein the polymerization agent comprises the specified mixture of fluoropolyether acids or salts in accordance the invention.

BRIEF DESCRIPTION OF THE DRAWINGS

FIG. 1 shows five mixtures of perfluoropolyether acids or salts of Formula (I) above illustrating embodiments of the invention (PFPE3 and PFPE4) and comparative mixtures (PFPE1, PFPE2 and PFPE5). FIG. 1 represents for each mixture the GC (gas chromatography) area percent plotted versus the number, n, in Formula (I).

DETAILED DESCRIPTION OF THE INVENTION

Mixture of Fluoropolyether Acids or Salts

A composition of the present invention comprises a mixture of fluoropolyether acids or salts having a number average value of about 800 to about 2500 g/mol. The amount of fluoropolyether acids or salt in the mixture having a molecular weight of not more than 500 g/mol is not more than 50 ppm by weight of the total amount of fluoropolyether acids or salts in the mixture. The amount of fluoropolyether acids or salts in the mixture having a molecular weight of 2500 g/mol or greater is not more than 40% by weight of the total amount of fluoropolyether acids or salts in the mixture. Preferably the fluoropolyether acids or salts comprise an anionic group selected from the group consisting of carboxylate, sulfonate, sulfonamide anion and phosphonate. While the terms carboxylate, sulfonate, and phosphonate are used in this application to identify anionic groups, these terms are intended to also encompass the anionic groups in corresponding acid form, i.e., carboxylic acid, sulfonic acid and phosphonic acid groups, respectively.

In preferred embodiments of the invention, the amount of fluoropolyether acids or salts in the mixture having a molecular weight of more than 2500 g/mol is not more than 35% by weight, not more than 30% by weight, not more than 20% by weight, not more than 10% by weight and not more than 7.5% by weight of the total amount of fluoropolyether acids or salts in the mixture.

In another embodiment of the invention the amount of fluoropolyethers in the mixture wherein the molecular weight is 3000 g/mol or greater is not more than 10% by weight of the total amount of fluoropolyether acids or salts in the mixture. In preferred embodiments of the invention, the amount of fluoropolyether acids or salts in the mixture wherein the molecular weight is 3000 g/mol or greater is not more than 7% by weight, not more than 5% by weight, and not more than 3% by weight.

In a further embodiment of the invention the amount of fluoropolyether acids or salts in the mixture wherein the molecular weight is 1000 g/mol or less is not more than 10% by weight of the total amount of fluoropolyether acids or salts in the mixture, more preferably not more than 1% by weight of the total amount of fluoropolyether acids or salts in the mixture.

In yet another embodiment of the invention, at least about 50% by weight of the fluoropolyether acids or salts in the mixture fall within the molecular weight range of about 800 to about 2500 g/mol. In other embodiments of the invention, at least about 60% by weight of the fluoropolyether acids or salts in the mixture, preferably 75% by weight of the fluoropolyether acids or salts in the mixture, and more preferably 90% by weight of the fluoropolyether acids or salts fall within the molecular weight range of about 800 to about 2500 g/mol.

In further embodiments of the invention, the composition comprises a mixture of fluoropolyether acids or salts having a number average molecular weight of about 1000 to about 2200 g/mol, preferably a number average molecular weight of about 1100 to about 2200 g/mol, more preferably a number average molecular weight of about 1100 to about 2000 g/mol.

More preferably, the fluoropolyether acid or salt is a perfluoropolyether acid or salt thereof. Preferred perfluoropolyether (PFPE) acids or salts thereof for use in accordance with the present invention can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

(—CFCF$_3$—CF$_2$—O—)$_n$     (II)

(—CF$_2$—CF$_2$—CF$_2$—O—)$_n$     (III)

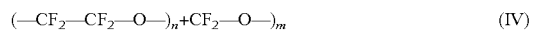

(—CF$_2$—CF$_2$—O—)$_n$+CF$_2$—O—)$_m$     (IV)

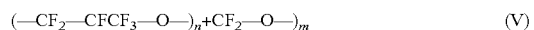

(—CF$_2$—CFCF$_3$—O—)$_n$+CF$_2$—O—)$_m$     (V)

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms.

In a preferred embodiment, a composition of the mixture of perfluoropolyether acids or salts of the present invention has the formula:

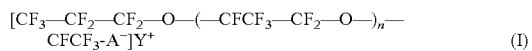

(I)

wherein $A^-$ is an anionic group selected from the group consisting of carboxylate, sulfonate, sulfonamide anion, and phosphonate; $Y^+$ is hydrogen, ammonium or alkali metal cation. The mixture can be derived from the polymerization of hexafluoropropylene oxide wherein n is at least 1 and has an average value of about 3 to about 13 (number average molecular weight of about 800 to about 2500 g/mol). The amount of perfluoropolyether in the mixture wherein n is 1 (molecular weight of about 496.1 g/mol) is not more than 50 ppm by weight of the total amount of perfluoropolyether acids or salts in the mixture. The amount of perfluoropolyether acids or salts in the mixture wherein n is 13 (molecular weight of about 2488.5 g/mol) or greater is not more than 40% by weight of the total amount of perfluoropolyether acids or salts in the mixture. In preferred embodiments of the invention, the amount of perfluoropolyether acids or salts in the mixture where n is greater than 13 (molecular weight of about 2488.5 g/mol) is not more than 35% by weight, not more than 30% by weight, not more than 20% by weight, not more than 10% by weight and not more than 7.5% by weight. All molecular weights noted for these perfluoropolyethers are based on the value for the corresponding carboxylic acid.

In another embodiment of the invention the amount of perfluoropolyether acids or salts in the mixture wherein n is 16 (molecular weight of about 2986.6 g/mol) or greater is not more than 10% by weight of the total amount of perfluoropolyether acids or salts in the mixture. In preferred embodiments of the invention, the amount of perfluoropolyether acids or salts in the mixture where n is 16 (molecular weight of about 2986.6 g/mol) or greater is not more than 7% by weight, not more than 5% by weight, and not more than 3% by weight.

In a further embodiment of the invention the amount of perfluoropolyether acids or salts in the mixture wherein n is 4 (molecular weight of about 994.2 g/mol) or less is not more than 10% by weight of the total amount of perfluoropolyether acids or salts in the mixture, more preferably not more than 1% by weight of the total amount of perfluoropolyether acids or salts in the mixture.

In yet another embodiment of the invention, at least about 50% by weight of the perfluoropolyether acids or salts in the mixture fall within the range of n=3 to n=13 (molecular weight range of about 828.2 to about 2488.5 g/mol). In other embodiments of the invention, at least about 60% by weight of the perfluoropolyether acids or salts in the mixture fall within the range of n=3 to n=13 (molecular weight range of about 828.2 to about 2488.5 g/mol), preferably 75%, and more preferably at least about 90% by weight of the perfluoropolyether acids or salts fall within this range.

In further embodiments of the invention, the composition comprises a mixture of perfluoropolyether acids or salts of Formula (I) wherein n has an average value of about 4 to about 11 (number average molecular weight of about 1000 to about 2200 g/mol), preferably an average value of about 5 to about 11 (number average molecular weight of about 1150 to about 2200 g/mol), more preferably an average value of about 5 to about 10 (number average molecular weight of about 1150 to about 2000 g/mol).

In a further embodiment of the invention, the mixture of perfluoropolyether acids or salts of this invention can be dispersed or dissolved in water or an organic liquid or mixtures thereof to form a composition comprising a mixture of perfluoropolyether acids or salts in an organic or aqueous liquid solution or dispersion.

In preferred embodiments, $A^-$ is carboxylate and $Y^+$ is hydrogen or ammonium. When the mixture is used in the polymerization of fluoromonomers as will be discussed below, $A^-$ is preferably carboxylate and $Y^+$ is preferably ammonium.

A mixture of perfluoropolyether acids or salts can be prepared by the polymerization of hexafluoropropylene oxide (HFPO), forming the perfluoropolyether acyl fluoride. The reaction product of the polymerization of hexafluoropropylene oxide is a mixture of perfluoropolyethers of varying degree of polymerization resulting in a distribution of various molecular weight oligomers. Low molecular weight oligomers are separated by distillation and recycled. In a preferred embodiment, the acyl fluoride can be hydrolyzed to carboxylic acid and converted to the salt by use of the appropriate base such as ammonium hydroxide to form the ammonium salt.

The mixture of perfluoropolyether acids or salts according to the present invention with specified limits on the amount of both low molecular weight and high molecular weight fractions can be obtained via fractional distillation of the perfluoropolyether acyl fluoride followed by hydrolysis and conversion to salt if desired.

Surfactant

As described in detail below, the mixture of perfluoropolyether acids or salts of the present invention can be employed as a polymerization agent for polymerizing at least one fluorinated monomer. In preferred embodiments, the polymerization agent further comprises surfactant. The surfactant can be selected from a large group of suitable surfactants including hydrocarbon surfactants, siloxane surfactants, and fluorosurfactants. Suitable hydrocarbon surfactants have been disclosed in U.S. Pat. No. 5,925,705 to Araki et al; and JP patent publications 2004/358397 and 2004/359870 to Tsuda et al. Suitable siloxane surfactants have been described in U.S. Pat. No. 6,841,616 to Wille et al. Preferably the surfactant is a fluorosurfactant and more preferably is a fluoroether surfactant.

Examples of fluorosurfactants that may be a component of the polymerization agent are described in U.S. Pat. No. 6,395,848 to Morgan et al. as fluoroalkyl, such as perfluoroalkyl carboxylic acids and salts thereof having 6-20 carbon atoms, or, more particularly, 6-12 carbon atoms, such as ammonium perfluorooctanoate and ammonium perfluorononanoate (see Berry, U.S. Pat. No. 2,559,752). However, it is preferred for the aqueous medium comprises less than about 300 ppm of perfluoroalkane carboxylic acid or salt fluorosurfactants having 8 or more carbon atoms, based on the weight of water in the aqueous medium. More preferably, the aqueous medium comprises less than about 100 ppm of perfluoroalkane carboxylic acid or salt fluorosurfactants having 8 or more carbon atoms, even more preferably less than 50 ppm. In a preferred embodiment of the invention, the aqueous medium is substantially free of perfluoroalkane carboxylic acid or salt fluorosurfactants having 8 or more carbon atoms. Substantially free of perfluoroalkane carboxylic acid or salt fluorosurfactants having 8 or more carbon atoms means that aqueous medium contains no more than about 10 ppm of such fluorosurfactants.

Perfluoroalkyl sulfonic acids and salt may also be used as fluorosurfactants. In a preferred embodiment of the invention, perfluoroalkyl ethane sulfonic acids and salts thereof are employed, preferably a compound or a mixture of compounds of the formula F—(—$CF_2$—$CF_2$—)$_n$—$CH_2CH_2$—$SO_3M$, wherein n is 2-8 and M is a cation having a valence of 1 as described in Khan & Morgan, U.S. Pat. No. 4,380,618. More preferably, such perfluoroalkyl ethane sulfonic acid surfactant comprises a compound of the formula $C_6F_{13}$—$CH_2CH_2$—$SO_3M$, wherein M is a cation having a valence of 1 as described in Baker & Zipfel, U.S. Pat. Nos. 5,688,884 and 5,789,508. Preferably, M in the above formula is $NH_4^+$.

Additional examples of such fluorosurfactants include perfluoroalkoxy benzene sulfonic acids and salts thereof wherein the perfluoroalkyl component of the perfluoroalkoxy has 4-12 carbon atoms, preferably 7-12 carbon atoms (as described in Morgan, U.S. Pat. No. 4,621,116). Additional examples of such surfactants also include partially-fluorinated surfactants having internal methylene groups and having the formula $R_f(CH_2)_m$—$R'_f$—COOM wherein m is 1-3, $R_f$ is perfluoroalkyl or perfluoroalkoxy containing 3-8 carbon atoms, $R'_f$ is linear or branched perfluoroalkylene containing 1-4 carbon atoms, and M is $NH_4$, Li, Na, K, or H (as described in Feiring et al., U.S. Pat. No. 5,763,552).

Examples of suitable fluoroether surfactants have been described in U.S. Pat. No. 3,271,341 to Garrison; U.S. patent publications 2007/0015864, 2007/0015865, and 2007/0015866 to Hintzer et al.; U.S. patent publications 2005/0090613 to Maruya et al. and 2006/0281946 to Morita et al.; PCT patent publications WO 2007046345 to Higuchi et al., 2007046377 to Funaki et al., 2007046482 to Hoshikawa et al., and 2007/049517 to Matsuoka et al.

In a preferred embodiment, the polymerization agent comprises the mixture of fluoropolyether acids or salts of the present invention in combination with a fluorosurfactant having the formula:

$$[R^1—O_n-L-A^-]Y^+ \quad (VII)$$

wherein:
$R^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
$A^-$ is an anionic group selected from the group consisting of carboxylate, sulfonate, sulfonamide anion, and phosphonate; and
$Y^+$ is hydrogen, ammonium or alkali metal cation;
with the proviso that the chain length of $R^1$—$O_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of the hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of $R^1$—$O_n$-L- is 3 to 6 atoms. In accordance with one preferred form of the invention the chain length of $R^1$—$O_n$-L- is 4 to 6 atoms. In accordance with another preferred form of the invention the chain length of $R^1$—$O_n$-L- is 3 to 5 atoms. Most preferably, the chain length of $R^1$—$O_n$-L- is 4 to 5 atoms.

A preferred class of fluorosurfactants is short chain fluoroether acids or salts, i.e., wherein n is 1 in Formula (VII) above. Preferred fluoroether acids or salts in the accordance with the invention are fluorosurfactants according to Formula (VII) wherein:

$R^1$ is a linear or branched partially or fully fluorinated alkyl group having 1 to 3 carbon atoms which may contain ether linkages; and
L is an alkylene group selected from —$CX(R^2)$—, wherein $R^2$ is fluorine or perfluoromethyl and X is hydrogen or fluorine, and —$CZ^1Z^2CZ^3Z^4$—, wherein $Z^1$, $Z^2$, $Z^3$, and $Z^4$ are independently selected from hydrogen or fluorine.

Fluoroether acids and salts of this type are known. When L is an alkylene group selected from —$CX(R^2)$—, wherein $R^2$ is fluorine or perfluoromethyl and X is hydrogen or fluorine, the compound can be made, for example, by hydrolysis of perfluoro-2-alkoxypropionyl fluoride intermediates prepared by reacting alkanoic acid fluorides with hexafluoropropylene oxide as disclosed in U.S. Pat. No. 3,291,843 to Fritz and Selman for use in perfluoro(alkyl vinyl ether) manufacture. When L is —$CZ_2CZ_2$—, wherein Z is independently selected from hydrogen or fluorine, routes to making such compounds are generally described In U.S. Pat. No. 2,713,593 (Brice et al.) where fluoro(alkoxypropionic) acids and derivatives are obtained in useful yields from corresponding hydrocarbon alkoxypropionic acids and derivatives by electrochemical fluorination. Fully fluorinated and partially fluorinated products can be separated for example by fractional distillation. Useful teachings for synthesis can also be found in EP 0 148 482 B1 (Ohsaka et al.) for partially fluorinated propoxy propionic acid fluoride which may be further fluorinated or perfluorinated by electrofluorinating the acid fluoride which is then easily converted to an acid or salt.

In accordance with another preferred form of the invention, L in Formula (VII) is an alkylene group selected from —$CF(CF_3)$—, —$CF_2$—, —$CF_2CF_2$—, —$CHFCF_2$—, and —$CF_2CHF$—.

The fluorosurfactant used in accordance with the invention may be a diether if R1 or L contains ether linkages. Such compounds are made, for example, by the teachings in WO 01/46116 A1 (Hintzer et al.). Preferred fluoroether acids or salts are fluoromonoethers where $R^1$ and L do not contain ether linkages.

In accordance with another preferred form of the invention, $R^1$ in Formula (VII) is a linear partially or fully fluorinated alkyl group having 2 to 3 carbon atoms. Preferably, $R^1$ is fully fluorinated.

In accordance with another preferred form of the invention, the fluorosurfactant is highly fluorinated. "Highly fluorinated" means that at least about 50% of the total number of fluorine and hydrogen atoms in the fluorosurfactant are fluorine atoms. More preferably, at least about 75% of the total number of fluorine and hydrogen atoms in the fluorosurfactant are fluorine atoms, most preferably at least about 90%. Perfluorinated surfactants are also preferred for use in accordance with the invention.

In accordance with one preferred embodiment of the invention, the fluorosurfactant is a compound of the formula:

$$[CF_3CF_2CF_2OCF(CF_3)COO^-]Y^+ \quad (VIII)$$

wherein $Y^+$ is hydrogen, ammonium, or alkali metal cation. This compound is represented by Formula (VII) wherein $R^1$ is $CF_3CF_2CF_2$—; L is —$CF(CF_3)$—; $A^-$ is carboxylate; and $Y^+$ is hydrogen, ammonium or alkali metal cation. Preferably, $Y^+$ is hydrogen or ammonium. A compound of this formula can be obtained from the perfluoro-2-propoxypropionyl fluoride intermediate prepared according to U.S. Pat. No. 3,291,843 or by dimerization of hexafluoropropylene oxide and subsequent hydrolysis of the resulting acid fluoride to carboxylic acid in the case of the acid and, in the case of the salt, by simultaneous or subsequent reaction with the appropriate base to produce the desired salt. A procedure for dimerization of hexafluoropropylene oxide is disclosed in G.B. Patent 1,292,268.

In accordance with another preferred embodiment of the invention, the fluorosurfactant is a compound of the formula:

$$[CF_3CF_2OCF(CF_3)COO^-]Y^+ \quad (IX)$$

wherein $Y^+$ is hydrogen, ammonium, or alkali metal cation. A compound of this formula can be obtained from the perfluoro-2-ethoxypropionyl fluoride intermediate prepared according to U.S. Pat. No. 3,291,843 and subsequent hydrolysis of the resulting acid fluoride to carboxylic acid in the case of the acid and, in the case of the salt, by simultaneous or subsequent reaction with the appropriate base to produce the desired salt.

In accordance with another preferred embodiment of the invention, the fluorosurfactant is a compound of the formula:

$$[CF_3CF_2CF_2OCF_2CF_2COO^-]Y^+ \quad (X)$$

wherein $Y^+$ is hydrogen, ammonium, or alkali metal cation. A compound of this formula can be made, for example, by the teachings of U.S. Pat. No. 2,713,593 (Brice et al.).

In accordance with another preferred form of the invention, the fluorosurfactant is a compound of Formula (VII) wherein n is 0 and $R^1$; L collectively comprises a perfluoroalkyl group having 4-6 carbons; and $A^-$ is sulfonate and sulfonamide anion. In a preferred embodiment of this form of the invention, $A^-$ is sulfonamide anion, the sulfonamide compound of Formula (XI) below:

$$[C_4F_9SO_2N^-CH_2CH_2OH]Y^+ \quad (XI)$$

wherein $Y^+$ is hydrogen, ammonium, or alkali metal cation. A surfactant of this formula as the ammonium salt is available commercially from 3M under the trademark NOVEC™ 4200.

In accordance with another preferred embodiment of the invention, the fluorosurfactant is a compound of the formula:

$$[CF_3CF_2CF_2CF_2CH_2CH_2SO_3^-]Y^+ \quad (XII)$$

wherein $Y^+$ is hydrogen, ammonium, or alkali metal cation.

Process

The invention further provides an aqueous dispersion polymerization process for polymerizing at least one fluoromonomer employing the mixture of fluoropolyether acids or salts of this invention as a polymerization agent. Fluoromonomers useful in this invention and fluoropolymers produced by this invention are described in more detail below.

A process in accordance with the invention comprises polymerizing at least one fluorinated monomer in an aqueous medium containing initiator and polymerization agent to form an aqueous dispersion of fluoropolymer particles, wherein the polymerization agent comprises a mixture of fluoropolyether acids or salts having a number average value of about 800 to about 2500 g/mol; wherein the amount of fluoropolyether acids or salts in the mixture having a molecular weight of not more than 500 g/mol is not more than 50 ppm by weight of the total amount of fluoropolyether acids or salts in the mixture; and wherein the amount of fluoropolyether acids or salts in the mixture having a molecular weight of 2500 g/mol or greater is not more than 40% by weight of the total amount of fluoropolyether acids or salts in the mixture A more preferred embodiment of the present invention is a process comprising polymerizing at least one fluorinated monomer in an aqueous medium containing initiator and polymerization agent to form an aqueous dispersion of fluoropolymer particles, wherein the polymerization agent comprises a mixture of perfluoropolyether acids or salts of the formula:

$$CF_3-CF_2-CF_2-O-(-CFCF_3-CF_2-O-)_n-CFCF_3-A^-]Y^+ \quad (I)$$

(I) wherein $A^-$ is an anionic group selected from the group consisting of carboxylate, sulfonate, sulfonamide anion, and phosphonate; $Y^+$ is hydrogen, ammonium or alkali metal cation. The mixture can be derived from the polymerization of hexafluoropropylene oxide wherein n is at least 1 and has an average value of about 3 to about 13 (number average molecular weight of about 800 to about 2500 g/mol). The amount of perfluoropolyether in the mixture wherein n is 1 is not more than 50 ppm by weight of the total amount of perfluoropolyether acids or salts in the mixture. The amount of perfluoropolyether acids or salts in the mixture wherein n is 13 or greater is not more than 40% by weight of the total amount of perfluoropolyether acids or salts in the mixture. In preferred embodiments of the invention, the amount of perfluoropolyether acids or salts in the mixture where n is greater than 13 is not more than 35% by weight, not more than 30% by weight, not more than 20% by weight, not more than 10% by weight and not more than 7.5% by weight.

There are benefits from using a mixture of fluoropolyether acids or salts of the present invention as a polymerization agent or component of a polymerization agent to produce fluoropolymers. The mixture of fluoropolyether acids or salts as defined by the present invention has specified limits on the amounts of both low and high molecular weight fractions, i.e., in the preferred embodiment, limits on the amounts of fluoropolyether acids or salts with both high and low numbers of repeating ether units, n, (—$CFCF_3$—$CF_2$—O—). The reduction in low molecular weight fractions has known toxicological and environmental benefits. Unexpectedly, the reduction in higher molecular weight fractions results in increased polymerization efficiency and can provide better control of polymer particle size, reduced coagulum (undispersed polymer), as well as providing an increased ability to control residual fluoropolyether acids or salts and/or by-products thereof in the polymerization product.

As will be shown in the Examples which follow, producing fluoropolymers using a polymerization agent containing a mixture of fluoropolyether acids or salts of the present invention in combination with a surfactant allows for the use of a significantly lower amount of fluoropolyether acids or salts while still achieving either comparable or reduced particle size and amounts of coagulum as compared to using fluoropolyether acids or salts containing higher molecular weight fluoropolyether fractions. In addition, by employing the molecular weight distribution of the mixture of fluoropolyether acids or salts in accordance with the present invention, particle size of the fluoropolymer resin can be tailored to meet specific applications.

In preferred embodiments of the invention, polymerization of at least one fluoromonomer is conducted in the presence of a polymerization agent comprising a mixture of fluoropolyether acids or salts of this invention where at least about 50% by weight of the fluoropolyether acids or salts in the mixture fall within the molecular weight range of about 800 g/mol to about 2500 g/mol. For the fluoropolyether acids or salts of Formula I, this molecular weight range corresponds to a range of n=3 to n=13. This range is also referred to as the "effective range" since it has been observed that a more efficient process for polymerization is achieved when mixtures contain high proportions of fluoropolyether acids or salts in this molecular weight range. In other embodiments of the invention, at least about 60% by weight of the fluoropolyether acids or salts in the mixture fall within the molecular weight range of about 800 g/mol to about 2500 g/mol, preferably 75%, and more preferably 90% by weight of the fluoropolyether acids or salts fall with this molecular weight range.

In a preferred polymerization process in accordance with the invention, the amount of the mixture of fluoropolyether acid or salt employed as polymerization agent in the aqueous polymerization medium preferably is present in the range of about 5 to about 3,000 ppm based on the weight of water in the aqueous polymerization medium.

In one preferred embodiment in which the polymerization agent further comprises fluorosurfactant, the ratio in the polymerization agent of the weight of the fluorosurfactant to the weight of the mixture of fluoropolyether acids or salts of the present invention is from about 2:1 to about 200:1. In other embodiments of the invention the ratio in the polymerization agent of the weight of the fluorosurfactant to the weight of the mixture of fluoropolyether acids or salts is from about 3:1 to about 150:1, preferably about 5:1 to about 100:1, more preferably 10:1 to about 80:1. In one embodiment, when polymerizing in a batch process, the polymerization agent is employed in the polymerization medium as a precharge at the beginning of polymerization and is added as a pumped mixture to the polymerization medium as polymerization proceeds and wherein the ratio in the polymerization agent of the weight of the fluorosurfactant to the weight of the mixture of fluoropolyether acids or salts is different in the precharged polymerization agent and the pumped mixture. In another embodiment, the ratio of fluorosurfactant to the weight of the mixture of fluoropolyether acids or salts is higher in pumped mixture than in the precharged polymerization agent. In yet another embodiment, the pumped mixture is essentially free of the mixture of fluoropolyether acids or salts, i.e., essentially only fluorosurfactant is pumped.

A further distinct benefit of the present invention is the ability to reduce or control residual fluoropolyether acids or salts and by-products of the fluoropolyether acids or salts generated during polymerization. For example, when a wet fluoropolymer powder containing a mixture of perfluoropolyether carboxylic acids or salts of the preferred embodiment of this invention is dried during the finishing steps of producing the polymer, heat may cause the mixture of perfluoropolyether acids or salts to decarboxylate and form the corresponding 2-hydrofluoropolyethers (sometimes referred to as E fluids) and referred to in this specification as by-products. Such 2-hydrofluoropolyethers have the following structure:

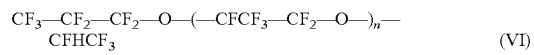

(VI)

These 2-hydrofluoropolyethers from low molecular weight oligomers have low enough boiling points such that their vapor products can be removed effectively from exhaust streams by methods such as aqueous scrubbing and particle absorption. When higher molecular weight oligomers are converted to 2-hydrofluoropolyethers, they become high boiling point oils. Such oils may clog duct work and other equipment or remain in small fractions in some polymer products.

Polymer product produced with a polymerization agent comprising the mixture of fluoropolyether acids or salts of this invention, contains less than about 250 ppm, more preferably less than about 200 ppm, even more preferably less than about 150 ppm, most preferably less than about 100 ppm and typically between about 25 ppm to 100 ppm of residual fluoropolyether acid or salt mixture or by-products thereof.

As shown in Example 14 of the Examples which follow, when producing polytetrafluoroethylene fine powder with the polymerization agent comprising fluorosurfactant and commercially available perfluoropolyether acid sold by DuPont as Krytox® FSL 157 in an 8:1 weight ratio, the polymer powder after drying contains between about 100 to about 280 ppm of E fluids ranging from E5 (n=4) to E31 (n=30). The E fluid numerical value is related to n in the following relationship: E(numerical value)=n+1. When PTFE fine powder is produced in the presence of a mixture of perfluoropolyether acids or salts of the present invention and fluorosurfactant, the polymer powder after drying typically contains only about 25 to about 80 ppm of E fluids ranging from E7 (n=8) to about E24 (n=25).

Yet another benefit is the ease of dispersability of the mixture of fluoropolyether acids or salts of the present invention in an aqueous medium and the resulting clarity of the composition and, if surfactant is used, when mixed with a surfactant to form a polymerization agent. Typically there is no need for an additional dispersing aid.

To form the polymerization agent, the mixture of fluoropolyether acids or salts is preferably dispersed adequately in aqueous medium to function effectively as a polymerization agent. "Dispersed" as used in this application refers to either dissolved in cases in which the mixture of fluoropolyether acids or salts is soluble in the aqueous medium, or dispersed in cases in which the mixture of fluoropolyether acids or salts is not fully soluble and are present in very small particles, for example about 1 nm to about 1 µm, in the aqueous medium. Similarly, "dispersing" as used in this application refers to either dissolving or dispersing the mixture of fluoropolyether acids or salts so that it is dispersed as defined above. Preferably, the mixture of fluoropolyether acids or salts is dispersed sufficiently so that the polymerization medium containing the mixture of fluoropolyether acids or salts appears water clear or nearly water clear. Clarity of the mixture is an indicator of improved polymerization performance, e.g., polymerizations employing the polymerization agent mixture providing lower haze produces less undispersed polymer (coagulum) than polymerization agent mixture with higher haze values.

Dispersing of the mixture of fluoropolyether acids or salts can be carried out by a variety of methods. In one suitable procedure, the polymerization agent can be made directly in the aqueous polymerization medium. In this procedure, the mixture of fluoropolyether acids or salts is supplied in acid form and subsequently converted to salt form. This is accomplished by first adding ammonium hydroxide or alkali metal hydroxide, preferably ammonium hydroxide, to the aqueous polymerization medium in a quantity sufficient to substantially completely convert to salt form the subsequently added fluoropolyether acid mixture. The fluoropolyether acid can then be added to the ammonium hydroxide or alkali metal hydroxide solution and, if desired, pH measurements can be made to determine if insufficient or excess base has been used. In addition, as known in the art, the amount of ammonium hydroxide or alkali metal hydroxide used, together with other materials added to the polymerization medium, should provide a pH in the aqueous polymerization medium which promotes the desired level of activity for the particular initiator system used and provides an operable pH range for the polymerization agent. If used, the surfactant can be added to the aqueous polymerization medium prior to, simultaneously with or subsequently to the addition of the mixture of fluoropolyether acids. Clarity of the mixture of fluoropolyether acids or salts and surfactant is an indicator of improved polymerization performance, e.g., polymerizations employing the mixture of fluoropolyether acids or salts and surfactant providing lower haze produce less undispersed polymer (coagulum) than polymerization agent mixture with higher haze values.

In a preferred embodiment employing a fluoroether carboxylic acid or salt surfactant, the mixture of fluoropolyether acids or salts is supplied in acid form and also the surfactant to be used is supplied in acid form. It has been discovered that the mixture of fluoropolyether acids and fluoroether carboxylic acid form a mixture which can readily be dispersed into an aqueous medium. In a preferred embodiment, a fluoroether carboxylic acid or salt and a mixture of fluoropolyether carboxylic acids or salts are both supplied in acid form. It has been discovered that the mixture of fluoropolyether carboxylic acids and fluoroether carboxylic acid fluorosurfactant will form a mixture which can be converted to salt form to make a concentrate in which the fluoropolyether carboxylate salt is dispersed. The concentrate is advantageously used by diluting with water to provide the mixture of fluoropolyether carboxylic acids or salts and fluoroether carboxylic acid or salt surfactant to the aqueous medium in dispersed form.

In accordance with a preferred form of the invention the polymerization agent used in the practice of the polymerization process of this invention is preferably substantially free of perfluoropolyether oil (i.e., perfluoropolyethers having neutral, nonionic end groups such as fluorine or hydrogen). Substantially free of perfluoropolyether oil means that the polymerization agent contains no more than about 10 ppm of such oils based on the weight of the polymerization agent.

In the practice of a preferred embodiment of the invention, the process is carried out as a batch process in a pressured reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a cooling jacket surrounding the reactor so that the reaction temperature may be conveniently controlled by circulation of a controlled temperature heat exchange medium.

In a typical process, the reactor is first charged with deionized and deaerated water of the polymerization medium and the polymerization agent is dispersed in the medium. For PTFE homopolymer and modified PTFE, paraffin wax as stabilizer is often added. A suitable procedure for PTFE homopolymer and modified PTFE includes first pressurizing the reactor with TFE. If used, the comonomer such as HFP or perfluoro (alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

Batch dispersion polymerizations can be described as proceeding in two phases. The initial period of the reaction can be said to be a nucleation phase during which a given number of particles are established. Subsequently, it can be said that a growth phase occurs in which the predominant action is polymerization of monomer on established particles with little or no formation of new particles. The transition from the nucleation to the growth phase of polymerization occurs smoothly, typically between about 4 and about 10 percent solids in the polymerization of TFE.

After batch completion (typically several hours) when the desired amount of polymer or solids content has been achieved, the feeds are stopped, the reactor is vented and purged with nitrogen, and the raw dispersion in the vessel is transferred to a cooling vessel.

The solids content of the dispersion upon completion of polymerization can be varied depending upon the intended use for the dispersion. For example, the process of the invention can be employed to produce a "seed" dispersion with low solids content, e.g., less than 10%, which is employed as "seed" for a subsequent polymerization process to a higher solids level. In other processes, the solids content of fluoropolymer dispersion produced by the process of the invention is preferably at least about 10 wt %. More preferably, the fluoropolymer solids content is at least about 20 wt %. A preferred range for fluoropolymer solids content produced by the process is about 20 wt % to about 65 wt %, even more preferably about 20 wt % to about 55 wt %, most preferably, about 35 wt % to about 55 wt %.

In a preferred process of the invention, polymerizing produces less than about 10 wt %, more preferably less than 3 wt %, even more preferably less than 1 wt %, most preferably less that about 0.5 wt % of undispersed fluoropolymer (coagulum) based on the total weight of fluoropolymer produced.

In one embodiment of the invention, the aqueous dispersion of fluoropolymer particles has a raw dispersion particle size of from about 10 to about 400 nm, preferably 100 to 350 nm.

The as-polymerized dispersion can be stabilized with anionic, cationic, or nonionic surfactant for certain uses. Typically however, the as-polymerized dispersion is transferred to a dispersion concentration operation which produces concentrated dispersions stabilized typically with nonionic surfactants by known methods. Solids content of concentrated dispersion is typically about 35 to about 70 wt %. Certain grades of PTFE dispersion are made for the production of fine powder. For this use, the PTFE particles in the as-polymerized dispersion are coagulated, the aqueous medium is removed and the PTFE resin is dried to produce fine powder.

The dispersion polymerization of melt-processable copolymers is similar except that comonomer in significant quantity is added to the batch initially and/or introduced during polymerization. Chain transfer agents are typically used in significant amounts to decrease molecular weight, i.e., to increase melt flow rate. The same dispersion concentration operation can be used to produce stabilized concentrated dispersions. Alternatively, for melt-processable fluoropolymers used as molding resin, the fluoropolymer particles in the dispersion are coagulated and the aqueous medium is removed. The resulting fluoropolymer resin is dried and then processed into a convenient form such as flake, chip or pellet for use in subsequent melt-processing operations.

The process of the invention may also be carried out as a continuous process in a pressurized reactor. A continuous process is especially useful for the manufacture of fluorocarbon elastomers.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processable TFE copolymers, water-soluble salts of inorganic peracids are employed which produce anionic end groups in the polymer. Preferred initiators of this type have a relatively long half-life at the temperature of polymerization, preferably persulfate salts, e.g., ammonium persulfate or potassium persulfate. To shorten the half-life of persulfate initiators, reducing agents such as ammonium bisulfite or sodium metabisulfite, with or without metal catalyst salts such as iron, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is preferably added at the beginning of the polymerization. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention for the polymerization of some types of polymers, e.g., for melt-processable TFE copolymers, to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative preferred examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluoropolymer.

Fluoropolymer

The mixture of fluoropolyether acids or salts of the present invention is useful as a polymerization agent to form fluoropolymer dispersions comprising particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 (CF$_2$=CF—O—CF$_2$CF$_2$SO$_2$F). Another example is CF$_2$=CF—O—CF$_2$—CF(CF$_3$)—O—CF$_2$CF$_2$CO$_2$CH$_3$, methyl ester of perfluoro(4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful when producing dispersions of polytetrafluoroethylene (PTFE) including modified PTFE. PTFE and modified PTFE typically have a melt creep viscosity of at least about 1×10$^8$ Pa·s and, with such high melt viscosity, the polymer does not flow significantly in the molten state and therefore is not a melt-processable polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The small amount of comonomer modifier improves film forming capability during baking (fusing). Comonomer modifiers include perfluoroolefin, notably hexafluoropropylene (HFP) or perfluoro(alkyl vinyl ether) (PAVE), where the alkyl group contains 1 to 5 carbon atoms, with perfluoro (ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also possible comonomer modifiers.

The invention is especially useful when producing dispersions of melt-processable fluoropolymers. By melt-processable, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processable fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processable TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about 10$^2$ Pa·s, more preferably, will range from about 10$^2$ Pa·s to about 10$^6$ Pa·s, most preferably about 10$^3$ to about 10$^5$ Pa·s measured at 372° C. by the method of ASTM D-1238 modified as described in U.S. Pat. No. 4,380,618. Additional melt-processable fluoropolymers are the copolymers of ethylene (E) or propylene (P) with TFE or CTFE, notably ETFE, ECTFE and PCTFE.

A preferred melt-processable copolymer formed in the practice of the present invention comprises at least about 40-98 mol % tetrafluoroethylene units and about 2-60 mol % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF2).

Further useful polymers are film forming polymers of polyvinylidene fluoride (PVDF) and copolymers of vinylidene fluoride as well as polyvinyl fluoride (PVF) and copolymers of vinyl fluoride.

The invention is also useful when producing dispersions of fluorocarbon elastomers. These elastomers typically have a glass transition temperature below 25° C. and exhibit little or no crystallinity, i.e. they are amorphous at room temperature. Fluorocarbon elastomer copolymers made by the process of this invention typically contain 25 to 70 wt %, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from the first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluorocarbon elastomer copolymers include TFE/PMVE, TFE/PMVE/E, TFE/P and TFE/P/VF2. Preferred VF2 based fluorocarbon elastomer copolymers include VF2/HFP, VF2/HFP/TFE, and VF2/PMVE/TFE. Any of these elastomer copolymers may further comprise units of cure site monomer.

TEST METHODS

Number and Weight Average Molecular Weight and n in Formula (I) for Fluoropolyether Carboxylic Acid or Salt—

The weight average molecular weight of the mixture of fluoropolyether acids or salts is determined by gas chromatography (GC) on an instrument equipped with either a flame ionization detector (FID) or a mass selective detector (MSD). Gas chromatography is suitably conducted on a chromatographic instrument such as an Agilent Model 6890. The fluoropolyether carboxylic acid or salt is first dissolved in a suitable solvent such as 2,3-dihydrodecafluoropentane (Vertrel® XF available from the DuPont Company) prior to GC injection. Typically, the fluoropolyether acid or salt with a concentration of less than 1% in the solvent are injected to a GC injector port which has a typical injector temperature of 300° C. For the purpose of this test method, the high temperature in the injector port will thermally convert the injected fluoropolyether acid or salt to the corresponding hydrofluoropolyether (Formula VI). The retention time of the different oligomers can be obtained using reference standards of known Formula VI composition. The area of each oligomer (GC area %) is measured and used to calculate the weight average molecular weight. The number average molecular weight is calculated from weight average molecular weight using standard formulas and is also independently measured using 19F NMR spectroscopy. Molecular weights are reported in this application as the carboxylic acid and not the converted hydrofluoroether compound. Average n in Formula (I) is derived from the weight average molecular weight.

The amount of fluoropolyether carboxylic acid or salt having a molecular weight above or below a certain level, e.g., 2500 g/mol or greater (or n being 13 or greater in Formula (I) is determined from the same data used for weight average molecular weight. Since GC area values are a good approximation of weight percent, GC area % values for the oligomers in the range of interest can be added together to determine the weight percent of oligomers in the range of interest.

Special selective ion monitoring (SIM) detection mode of the GC using a mass selector detector is utilized for the quantification for perfluoropolyether acid or salt of Formula (I) in which n=1 and calibration standards of known concentrations are prepared.

Residual Analysis—

Using a 2,3-dihydrodecafluoropentane solvent (Vertrel® XF available from the DuPont Company), multiple solvent extractions of polymer samples are performed at elevated temperature and the resulting extracted solvent is analyzed for total fluoropolyether acids or salts and by-products thereof by GC with either FID or MSD as described above by comparison to calibration standards of hydrofluoropolyether (Formula VI) in the same solvent.

The melting point (Tm) and glass transition temperature (Tq) of copolymers is measured by differential scanning calorimetry (DSC) according to the procedure of ASTM D 4591. PTFE homopolymer melting point, the melting point the first time the polymer is heated, also referred to as the first heat, is determined by differential scanning calorimetry (DSC) by the method of ASTM D-4591-87. The melting temperature reported is the peak temperature of the endotherm on first melting.

Standard specific gravity (SSG) is measured by the method of ASTM D-4895.

Comonomer content (PPVE or HFP) is measured by FTIR according to the method disclosed in U.S. Pat. No. 4,743, 658, col. 5, lines 9-23.

Comonomer content (PDD) is measured by IR by comparing the absorbance ratio at 2404 $cm^{-1}$ to 1550 $cm^{-1}$ to a calibration curve Melt flow rate (MFR) is measured according to ASTM D-1238 at the temperature which is standard for the specific copolymer.

Raw dispersion particle size (RDPS) is measured by photon correlation spectroscopy using a Microtrac® Nanotrac Particle Size Analyzer.

Polymerization Agent Components

As a fluorosurfactant, fluoromonoether acid is employed having the formula $CF_3CF_2CF_2OCF(CF_3)COOH$ (referred to as dimer acid or DA) which is converted to the ammonium salt in the examples which follow (referred to as dimer acid salt or DAS).

Five mixtures of fluoropolyether acids are employed which are perfluoropolyether acids having carboxylic acid groups (PFPEA), i.e., each being represented by Formula (I) above where $A^-$ is carboxylate and $Y^+$ is H. The acids are converted to ammonium salts in the examples which follow.

The molecular weight distributions of the five mixtures of fluoropolyether acids used in the Examples are listed in Table 1. Average molecular weight and average n values and % n values in the indicated ranges listed in the table are based on number average molecular weight with the exception of the column labeled weight average molecular weight.

TABLE 1

| Molecular Weight Distribution of Mixtures of PFPEA's | | | | | | | | |
|---|---|---|---|---|---|---|---|---|
| | # Avg MW | Wt Avg MW | Avg n | ppm n = 1 | % n ≤ 4 | % n ≥ 13 | % n ≥16 | % n = 3 to n = 13 |
| PFPEA1 | 2785 | 3088 | 14.8 | <10 | 1.273 | 64.130 | 44.398 | 42.272 |
| PFPEA2 | 2239 | 2676 | 11.5 | 30 | 3.783 | 35.076 | 24.675 | 68.620 |
| PFPEA3 | 1556 | 1669 | 7.4 | 10 | 5.069 | 3.726 | 1.257 | 97.484 |
| PFPEA4 | 1292 | 1431 | 5.8 | 40 | 32.125 | 2.184 | 1.009 | 97.124 |
| PFPEA5 | 2425 | 2787 | 12.6 | 30 | 6.170 | 49.006 | 30.605 | 57.224 |

PFPEA2 is commercially available as Krytox® 157 FSL from DuPont and is a comparative mixture. PFPEA1 and PFPEA5 are also comparative mixtures. PFPEA3 and PFPEA4 are mixtures in accordance with the invention.

The distribution of molecular weights of the polyether mixtures is graphically shown in FIG. 1, where the % area using GC (GC area %) is plotted against the number n in Formula (I).

By observing the height of the peaks and distribution of the curves in the range of n=3 to n=13, the graph clearly displays the high quantity of "effective range" in the mixture of perfluoropolyether acids or salts of this invention (PFPEA3 and PFPEA4) as compared to the comparative mixtures of polyethers acids or salts having a broader molecular weight distribution. By employing mixtures of polyethers in accordance with this invention, a highly efficient process for polymerization is achieved as is demonstrated by the following examples.

The ammonium hydroxide used is a 30 wt % aqueous solution (wt % calculated as $NH_3$).

Preparation of Polymerization Agents

Polymerization agent mixtures 1 through 11 are prepared as concentrated aqueous mixtures by using the ingredients and quantities indicated in Table 2A and polymerization agents 12 through 15 are prepared by using the ingredients and quantities indicated in Table 3A. The indicated amounts of PFPEA and DA are combined in a 450 mL glass jar while vigorously stirring for about 30 to 60 minutes. The indicated amount of 30% ammonium hydroxide solution ($NH_4OH$) is slowly added to the PFPEA/DA mixture while stirring and cooling in a water bath. Polymerization agent mixture 16 is prepared by first combining 74.90 g of PFPEA 3 and 2999.80 g of DA in a 1 gallon (3785 mL) jug and vigorously stirring for ~60 minutes. 900 mL of 30% ammonium hydroxide solution (NH$_4$OH) is then slowly added to the PFPEA/DA mixture while stirring and cooling in a water bath. Only a portion of this concentrated stock solution of polymerization agent 16 is used for Example 10. Polymerization agent mixtures 1, 3, and 5 through 16 are a water clear or nearly water clear mixture. Polymerization agent mixtures 2 and 4 show a slight haze.

Polymerization agent mixtures 17, 18, 21, 22, and 23 are prepared as follows using the amounts indicated in Table 4A, while polymerization agent mixtures 19, 20, and 24 are prepared as follows using the amounts indicated in Table 5A. The indicated amounts of PFPEA and DA are combined in a 100 mL glass jar while vigorously stirring for ~5 to 30 minutes. The indicated amount of 30% ammonium hydroxide solution (NH$_4$OH) is slowly added to the PFPEA/DA mixture while cooling in a water bath. The resulting mixture is slowly poured into a 4 L glass beaker containing the indicated amount of rapidly stirring deionized (DI) water to provide a water clear or nearly water clear mixture.

EXAMPLES

The process of the invention is illustrated in Examples 1-10 in the polymerization of tetrafluoroethylene copolymers with comparison to Comparative Examples 1-6.

Comparative Example 1—TFE/HFP/PEVE

A cylindrical, horizontal, water-jacketed, paddle-stirred, stainless steel reactor having a length to diameter ratio of about 1.5 and a water capacity of 10 gallons (37.9 L) is charged with polymerization agent mixture 1 and 50 pounds (22.7 kg) of deionized water. The jar that had been used for polymerization agent mixture 1 is rinsed twice with about 20 mL of deionized water each time, and the contents of each rinse is added to the reactor. With the reactor paddle agitated at 46 rpm, the reactor is heated to 65° C. then, evacuated and purged three times with TFE. The reactor temperature then is increased to 103° C. After the temperature has become steady at 103° C., HFP is added slowly to the reactor until the pressure is 430 psig (3.07 MPa). Then 92 mL of liquid PEVE is injected into the reactor and TFE is added to the reactor to achieve a final pressure of 630 psig (4.45 MPa). Then 40 mL of freshly prepared aqueous initiator solution containing 4.40 wt % of ammonium persulfate (APS) is charged into the reactor. This same initiator solution is pumped into the reactor at 3.5 mL/min for the remainder of the polymerization after polymerization has begun as indicated by a 10 psig (70 kPa) drop in reactor pressure, i.e., kickoff. Additional TFE is also added to the reactor beginning at kickoff at a rate of 21.3 lb (9.66 kg)/125 min until a total of 21.3 lb (9.66 kg) of TFE has been added to the reactor after kickoff. Furthermore, liquid PEVE is added to the reactor beginning at kickoff at a rate of 1.0 mL/min for the duration of the reaction. The total reaction time is 125 min after initiation of polymerization. At the end of the reaction period, the TFE feed, PEVE feed, and the initiator feed are stopped, and the reactor is cooled while maintaining agitation. When the temperature of the reactor contents reaches 90° C., the reactor is slowly vented. After venting to nearly atmospheric pressure, the reactor is purged with nitrogen to remove residual monomer. Upon further cooling, the dispersion is discharged from the reactor at below 70° C. Solids content of the dispersion is 36.99 wt % and raw dispersion particle size (RDPS) is 228.5 nm. After mechanical coagulation, the polymer is dried in a 150° C. convection air oven. The TFE/HFP/PEVE terpolymer (FEP) has a melt flow rate (MFR) of 14.0 g/10 min, an HFP content of 10.17 wt %, and a PEVE content of 0.46 wt %.

Comparative Examples 2-4—TFE/HFP/PEVE

Comparative examples 2 through 4 are performed in a manner similar to comparative Example 1, with the polymerization agent mixture employed having a different PFPEA type and/or amount of PFPEA used as shown in Table 2A. Results are reported in Table 2B.

Examples 1-7—TFE/HFP/PEVE

Examples 1 through 7 are performed in a manner similar to comparative example 1, with the polymerization agent mixture employed having a PFPEA in accordance with the invention, PFPEA 3 or PFPEA 4, and/or varying amounts of PFPEA and DA used as shown in Table 2A. Results are reported in Table 2B. Using similar quantities of PFPEA in the polymerization agent, Examples 1 and 3 illustrate the invention by showing improved performance of polymerization as compared to Comparative Examples 1 and 3 as indicated by smaller RDPS and less coagulum. Using similar quantities of PFPEA in the polymerization agent, Examples 2 and 4 also illustrate the invention by showing improved performance of polymerization as compared to Comparative Examples 2 and 4 as indicated by smaller RDPS and less coagulum. Using significantly less PFPEA in the polymerization agent, Examples 5, 6, and 7 show equal or improved performance of polymerization as compared to Comparative Examples 1-4.

TABLE 2A

| Example | Polymerization Agent | PFPEA Type | PFPEA (g) | DA (g) | NH$_4$OH (mL) |
|---|---|---|---|---|---|
| Comp Ex 1 | 1 | 1 | 10.00 | 50.00 | 20.00 |
| Comp Ex 2 | 2 | 1 | 5.00 | 50.00 | 20.00 |
| Comp Ex 3 | 3 | 2 | 10.00 | 50.00 | 20.00 |
| Comp Ex 4 | 4 | 2 | 5.00 | 50.00 | 20.00 |
| Ex 1 | 5 | 3 | 10.00 | 50.00 | 21.00 |
| Ex 2 | 6 | 3 | 5.00 | 50.00 | 20.00 |
| Ex 3 | 7 | 4 | 10.00 | 50.00 | 21.00 |
| Ex 4 | 8 | 4 | 5.00 | 50.00 | 21.00 |
| Ex 5 | 9 | 4 | 2.50 | 50.00 | 20.00 |
| Ex 6 | 10 | 4 | 2.50 | 75.00 | 30.00 |
| Ex 7 | 11 | 4 | 2.50 | 100.00 | 42.58 |

TABLE 2B

| Example | HFP Content (wt %) | PEVE Content (wt %) | MFR | Solids (wt %) | RDPS (nm) | Wet Coagulum (g) |
|---|---|---|---|---|---|---|
| Comp Ex 1 | 10.17% | 0.46% | 14.00 | 36.99% | 228.5 | 1,413 |
| Comp Ex 2 | 8.55% | 1.17% | 19.75 | 32.13% | 281.1 | 3,656 |
| Comp Ex 3 | 9.83% | 1.19% | 32.30 | 36.10% | 200.3 | 1,153 |
| Comp Ex 4 | 9.78% | 1.15% | 31.94 | 36.00% | 209.6 | 1,353 |
| Ex 1 | 10.77% | 1.12% | 34.79 | 36.46% | 159.4 | 700 |
| Ex 2 | 10.90% | 1.18% | 38.47 | 36.68% | 151.6 | 852 |
| Ex 3 | 11.41% | 1.30% | 39.33 | 39.73% | 133.5 | 830 |
| Ex 4 | 10.92% | 1.27% | 36.01 | 38.80% | 140.1 | 1,272 |
| Ex 5 | 10.22% | 1.20% | 32.72 | 36.44% | 176.9 | 1,843 |
| Ex 6 | 9.40% | 1.30% | 26.80 | 36.92% | 204.2 | 1,129 |
| Ex 7 | 9.80% | 1.19% | 25.65 | 36.80% | 201.9 | 460 |

Comparative Example 5—TFE/HFP

A cylindrical, horizontal, water-jacketed, paddle-stirred, stainless steel reactor having a length to diameter ratio of about 1.5 and a water capacity of 10 gallons (37.9 L) is charged with polymerization agent mixture 12 from Table 3 and 48 pounds (21.8 kg) of deionized water. The jar that had been used for polymerization agent mixture 12 is rinsed twice with about 20 mL of deionized water each time, and the contents of each rinse is added to the reactor. With the reactor paddle agitated at 46 rpm, the reactor is heated to 65° C., evacuated and purged three times with TFE. The reactor temperature then is increased to 103° C. After the temperature has become steady at 103° C., HFP is added slowly to the reactor until the pressure is 455 psig (3.24 MPa). Then TFE is added to the reactor to achieve a final pressure of 610 psig (4.31 MPa). Then 20 mL of freshly prepared aqueous initiator solution containing 2.117 wt % of ammonium persulfate (APS) and 1.917 wt % of potassium persulfate (KPS) is charged into the reactor. A freshly prepared aqueous initiator solution containing 1.316 wt % of ammonium persulfate (APS) and 1.191 wt % of potassium persulfate (KPS) is pumped into the reactor at 1.9 mL/min for the remainder of the polymerization after polymerization has begun as indicated by a 10 psi (70 kPa) drop in reactor pressure. Additional TFE is also added to the reactor beginning at kickoff at a rate of 21.5 lb (9.75 kg)/140 min until a total of 21.5 lb (9.75 kg) of TFE has been added to the reactor after kickoff. The total reaction time is 140 min after initiation of polymerization. At the end of the reaction period, the TFE feed and the initiator feed are stopped, and the reactor is cooled while agitating at a reduced speed of 10 rpm. When the temperature of the reactor contents reaches 90° C., the reactor is slowly vented. After venting to nearly atmospheric pressure, the reactor is purged with nitrogen to remove residual monomer. Upon further cooling, the dispersion is discharged from the reactor at below 70° C. Solids content of the dispersion is 34.72 wt % and RDPS is 181.7 nm. After mechanical coagulation, the polymer is dried in a 150° C. convection air oven. The TFE/HFP copolymer (FEP) has a melt flow rate (MFR) of 2.50 g/10 min and an HFP content of 10.76 wt.

Comparative Example 6—TFE/HFP

Comparative Example 6 is performed in a manner similar to Comparative Example 5 except that polymerization mixture 13 is employed with an increased amount of PFPEA 5 and DA compared to polymerization agent mixture 12 as shown in Table 3A. Results are reported in Table 3B.

TABLE 3A

| Example | Polymerization Agent | PFPEA Type | PFPEA (g) | DA (g) | NH$_4$OH (mL) |
| --- | --- | --- | --- | --- | --- |
| Comp Ex 5 | 12 | 5 | 12.49 | 50.00 | 21.00 |
| Comp Ex 6 | 13 | 5 | 17.51 | 70.00 | 29.00 |
| Ex 8 | 14 | 3 | 5.00 | 49.90 | 20.00 |
| Ex 9 | 15 | 3 | 2.60 | 75.00 | 30.00 |
| Ex 10 | 16 | 3 | 2.07 | 82.89 | 24.86 |

TABLE 3B

| Example | HFP Content (wt %) | MFR | Solids (wt %) | RDPS (nm) | Wet Coagulum (g) |
| --- | --- | --- | --- | --- | --- |
| Comp Ex 5 | 10.76% | 2.50 | 34.72% | 181.7 | 502 |
| Comp Ex 6 | 10.95% | 2.23 | 35.06% | 185.1 | 400 |
| Ex 8 | 12.43% | 9.50 | 36.68% | 157.4 | 976 |
| Ex 9 | 12.84% | 10.81 | 37.39% | 142.7 | 452 |
| Ex 10 | 12.74% | 11.53 | 37.11% | 133.9 | 348 |

Examples 8-9—TFE/HFP

Examples 8 and 9 are performed in a manner similar to Comparative Example 5, but the polymerization agent mixtures employed have a PFPEA in accordance with the invention, PFPEA3, and in significantly decreased amounts as shown in Table 3A. The DA amount is varied. Several other minor changes are also made including using a single fresh initiator solution produced with 3.74 wt % of ammonium persulfate (APS) that is pumped to the reactor at 3.4 mL/min during reaction, increasing the HFP pressure to 466 psig (3.31 MPa), and increasing the TFE pressure before the reaction starts to 650 psig (4.58 MPa). Results are reported in Table 3B. Examples 8 and 9 demonstrate the invention by achieving smaller RDPS and acceptable coagulum with significantly less PFPEA than Comparative Examples 5 and 6, respectively.

Example 10—TFE/HFP

Example 10 is performed in a manner similar to Example 8, but the polymerization agent mixture 16 is added to the reactor while the reactor is paddle agitated at 93 rpm. The polymerization agent mixture 16 is shown in Table 3A. Results are reported in Table 3B. Example 10 illustrates the invention by producing significantly smaller particle size and less coagulum than Comparative Example 6 with only 12% of the PFPEA.

The process of the invention is illustrated in Examples 11, 12 and 13 in the polymerization of PTFE homopolymer and compared with Comparative Examples 7 and 8.

Comparative Example 7—PTFE

A cylindrical, horizontal, water-jacketed, paddle-stirred, stainless steel reactor having a length to diameter ratio of about 1.5 and a water capacity of 10 gallons (37.9 L) is charged with 40.6 pounds (18.4 kg) of deionized water, 600 g of paraffin wax, 0.05 g of the ethoxylated alcohol Tomadol® 23-1, 4.3 g of succinic acid, and 15 mL of a 0.02 m/v % aqueous oxalic acid solution. While agitating at 46 rpm, the contents of the reactor are heated to 65° C., and the reactor is evacuated and purged three times with TFE. Polymerization agent mixture 17 (see Table 4A) is then added. TFE is added until the pressure is 400 psig (2.9 MPa). Then, 240 mL of an aqueous initiator solution comprised of 0.036 g of KMnO$_4$ and 0.017 g of ammonium phosphate is added at the rate of 80 mL/min. When this addition is completed, 2375 mL of polymerization agent mixture 18 (see Table 4A) is added at a rate of 64 mL/min and additional initiator solution is added at a rate of 5 mL/min. TFE is added at a rate sufficient to maintain 2.9 MPa. After 3 lbs (6.6 kg) of TFE has been added following initial pressurization, the temperature is raised to 72° C. After 14.6 lbs (32.1 kg) of TFE has been added following initial pressurization, initiator solution addition is stopped. After 17.6 lbs of TFE has been added following initial pressurization, the temperature is raised to 80° C. After a total of 24 lbs (52.8 kg) of TFE has been fed following initial pressurization, TFE addition is stopped and the reactor is vented. The contents of the reactor are discharged and the supernatant wax is removed. Solids content of the dispersion is 36.89 wt % and the RDPS is 230.3 nm. The dispersion is diluted to 12% solids and coagulated in the presence of ammonium carbonate under vigorous agitation. The coagulated dispersion is separated from the liquid and dried at 150° C. for three days to produce fine powder. The standard specific gravity (SSG) of the resulting PTFE homopolymer, measured according to the method described in U.S. Pat. No. 4,036,802, is determined to be 2.173.

Comparative Example 8—PTFE

The reactor used in Comparative Example 7 is charged with 46 pounds (20.9 kg) of deionized water, 600 g of paraffin wax, 0.05 g of the ethoxylated alcohol Tomadol® 23-1, 4.3 g of succinic acid, and 15 mL of a 0.02 m/v % aqueous oxalic acid solution. While agitating at 46 rpm, the contents of the reactor are heated to 65° C., and the reactor is evacuated and purged three times with TFE. Polymerization agent mixture 19 (see Table 5A) is then added. TFE is added until the pressure is 400 psig (2.9 MPa). Then, 240 mL of an aqueous initiator solution comprised of 0.036 g of $KMnO_4$ and 0.017 g of ammonium phosphate is added at the rate of 80 mL/min. When this addition is completed, polymerization agent composition 20 (see Table 5A) is added at a rate of 3 mL/min and additional initiator solution is added at a rate of 6 mL/min. TFE is added at a rate sufficient to maintain 2.9 MPa. After 3 lbs of TFE has been added following initial pressurization, the temperature is raised to 70° C. After 14.6 lbs of TFE has been added following initial pressurization, initiator solution addition is stopped. After 17.6 lbs of TFE has been added following initial pressurization, the temperature is raised to 80° C. After a total of 24 lbs of TFE has been fed following initial pressurization, TFE addition is stopped and the reactor is vented. The contents of the reactor are discharged and the supernatant wax is removed. Solids content of the dispersion is 35.31 wt % and the RDPS is 220.4 nm. The dispersion is diluted to 12% solids and coagulated in the presence of ammonium carbonate under vigorous agitation. The coagulated dispersion is separated from the liquid and dried at 150° C. for three days to produce fine powder. The standard specific gravity (SSG) of the resulting PTFE homopolymer, measured according to the method described in U.S. Pat. No. 4,036,802, is determined to be 2.174.

Example 11—PTFE

Example 11 is performed in a manner similar to Comparative Example 7, with the polymerization agent mixtures 21 and 22 employed having a PFPEA type in accordance with the invention, PFPEA3, and the amounts of PFPEA3 used as shown in Table 4A. The PFPEA amount in the precharge mixture is approximately half the amount of Comparative Example 7 with the same amount of DA. PFPEA and DA amounts in the polymerization agent mixtures for the pumped mixture are the same as in Comparative Example 7. Results are reported in Table 4B. Example 11 illustrates the invention in that similar polymer properties are obtained while using half the amount of PFPEA in the precharge as compared to Comparative Example 7.

Example 12—PTFE

Example 12 is performed in a manner similar to Comparative Example 7, with the polymerization agent mixtures 23 and 22 employed having a PFPEA type in accordance with the invention, PFPEA3, as shown in Table 4A. PFPEA and DA amounts in the polymerization agent mixtures are the same as in Comparative Example 7. Results are reported in Table 4B. Example 12 illustrates an advantage of the invention by achieving smaller RDPS and less residual perfluoropolyether acids or salts and/or byproducts in the dried PTFE fine powder resin as compared to polymer prepared by Comparative Example 7. The Residual Analysis test method is employed with dried fine powder resins prepared as described in Example 14.

TABLE 4A

| Example | Polym. Agent | Polym. Agent Type | PFPE Type | PFPE (g) | DA (g) | $NH_4OH$ (g) | DI $H_2O$ (g) |
|---|---|---|---|---|---|---|---|
| Comp Ex 7 | 17 | Precharge | 2 | 5.3 | 26.5 | 6.0 | 1552.2 |
|  | 18 | Pump | 2 | 6.4 | 64.0 | 10.5 | 2312.7 |
| Ex 11 | 21 | Precharge | 3 | 2.7 | 26.5 | 6.0 | 1552.2 |
|  | 22 | Pump | 3 | 6.4 | 64.0 | 10.5 | 2312.7 |
| Ex 12 | 23 | Precharge | 3 | 5.3 | 26.5 | 6.0 | 1552.2 |
|  | 22 | Pump | 3 | 6.4 | 64.0 | 10.5 | 2312.7 |

TABLE 4B

| Example | Reaction Time (min) | Solids (wt %) | RDPS (nm) | Wet Coagulum (g) | SSG |
|---|---|---|---|---|---|
| Comp Ex 7 | 96 | 36.89% | 230.3 | 416 | 2.173 |
| Ex 11 | 113 | 35.99% | 237.5 | 470 | 2.176 |
| Ex 12 | 86 | 36.89% | 217.5 | 460 | 2.181 |

Example 13—PTFE

Example 13 is performed in a manner similar to Comparative Example 8, with the polymerization agent compositions 24 and 20 having a PFPEA in accordance with the invention, PFPEA3 and the amount used as shown in Table 5A. (Note, the pumped polymerization agent mixtures in Example 13 and Comparative Example 8 do not contain PFPEA, only DA). Results are reported in Table 5B. Example 13 illustrates the invention in that similar polymer properties are obtained while using half the amount of PFPEA in the precharge as compared to Comparative Example 8.

TABLE 5A

| Example | Polym. Agent | Polym. Agent Type | PFPE Type | PFPE (g) | DA (g) | $NH_4OH$ (g) | DI $H_2O$ (g) |
|---|---|---|---|---|---|---|---|
| Comp Ex 8 | 19 | Precharge | 2 | 5.3 | 26.5 | 6.0 | 1552.2 |
|  | 20 | Pump | — | 0.0 | 64.0 | 0.0 | 256.2 |
| Ex 13 | 24 | Precharge | 3 | 2.7 | 26.5 | 6.0 | 1552.2 |
|  | 20 | Pump | — | 0.0 | 64.0 | 0.0 | 256.2 |

TABLE 5B

| Example | Reaction Time (min) | Solids (wt %) | RDPS (nm) | Wet Coagulum (g) | SSG |
|---|---|---|---|---|---|
| Comp Ex 8 | 105 | 35.31% | 220.4 | 626 | 2.174 |
| Ex 13 | 96 | 35.53% | 215.4 | 614 | 2.171 |

Example 14—Residual PFPEA/Byproducts—PTFE

PTFE polymer is prepared according to Comparative Example 7 using a total (precharge and pumped mixtures) of 90.5 g of DA and 11.7 g of PFPEA2 (approximately an 8:1 ratio see Table 4A). The polymer is initially dried at 150° C. in an oven with limited air flow. The polymer powder after drying contains between about 100 to about 280 ppm of E fluids ranging from E5 (n=4) to E31 (n=30).

PTFE polymer is prepared according to Example 12 using a total (precharge and pumped mixtures) of 90.5 g of DA and 11.7 g of PFPEA3 (approximately an 8:1 ratio see Table 4A). The polymer is initially dried at 150° C. in an oven with limited air flow. The polymer powder after drying contains only about 25 to about 80 ppm of E fluids ranging from E7 (n=8) to about E24 (n=25).

To simulate commercial production where driers have a continuous air flow, the polymer powder samples are further dried on a Lindberg/Blue M Model 55035 "Mini-mite" 800-watt tube furnace with a 30 cm heating zone. The furnace is equipped with a quartz flow-through tube where the polymer samples are placed in the middle section (~5-10 cm) of the quartz tube. A thermocouple is placed inside the polymer sample for precise temperature measurement. The sample is preheated to a designated temperature (180-200° C.) with house air flowing at a fixed flow rate (120 cc/min) for 20-30 minutes. The temperature, air flow rate and heating duration are selected to simulate plant drying conditions.

Results from additional drying indicate, when PFPEA2 is used, the residual PFPEA and E-fluid byproducts content in the polymer is from about 50 to about 150 ppm ranging from E10 (n=11) to E31 (n=32).

Results from additional drying indicate, when PFPEA3 is used, the residual PFPEA and E-fluid byproducts content in the polymer is from about 10 to about 40 ppm ranging from E10 (n=11) to E24 (n=25).

Example 15—TFE/PPVE

Preparation of Polymerization Agent Mixture 25

In a vial is added 0.15 grams of PFPEA3 and 15 grams of DA. The vial is capped and shaken to produce a clear, single phase mixture. To the vial is added 4.4 grams of NH$_4$OH (30 wt % as NH$_3$). The vial is capped and shaken under cold running water to remove the heat of reaction. In a 1 liter glass jar is added 900 grams of deionized water. The water is deoxygenated by bubbling nitrogen through the fluid using a glass tube fitted with a fritted glass end. While using a magnetic stirrer to vigorously agitate the water, the contents of the vial are slowly added to the water using a pipette. The resulting mixture is water clear. An additional 5 grams of DA is added to the vigorously stirring mixture. The fluid is still water clear and has a pH of 8.5 as measured by pH paper. Net contents of polymerization agent mixture 25 are: 0.15 gm PFPEA3, 20 gm DA, 4.4 gm NH$_4$OH(30%) and 900 gm water.

Polymerization

A cylindrical, horizontal, water-jacketed, paddle-stirred, stainless steel reactor having a length to diameter ratio of about 1.5 and a water capacity of 12 liters is charged with polymerization agent mixture 25 and 5.1 kg of deionized water. The reactor is evacuated to about 20 inches of Hg vacuum (33 Pa) and then raised to a pressure of about 30 psig (310 kPa) by addition of nitrogen. This evacuation cycle is repeated a total of 3 times. The reactor is again evacuated to about 20 inches of Hg vacuum (33 Pa) and raised to about 30 psig (310 kPa) by addition of TFE. The reactor pressure is reduced to a pressure slightly above atmospheric pressure by controlled venting of the reactor vapor space. For two more cycles the pressure is raised to 30 psig (310 kPa) with TFE and vented to slightly above atmospheric pressure. While at ambient temperature, 0.2 grams of gaseous ethane is metered to the reactor. Agitation is started and the agitator speed is set to 70 RPM. 75 ml of PPVE is pumped into the reactor. The reactor is heated to an operating temperature of 75° C. Reactor pressure is raised to 310 psig (2.24 MPa) by adding 550 grams of TFE. 50 ml of initiator is added to the reactor at the rate of 25 ml/min, followed by a continuous feed of initiator at the rate of 0.5 ml/min. The initiator solution is prepared immediately prior to starting the polymerization procedure by adding 6.2 grams of reagent grade ammonium persulfate to 1000 grams of deoxygenated, deionized water. Polymerization is considered to have begun when the reactor pressure drops 10 psi (70 kPa) to 300 psig (2.17 MPa). Reactor pressure is held at 300 psig (2.17 MPa) by the controlled addition of TFE. PPVE addition varies in proportion to TFE flow in the ratio of 0.03 ml PPVE per gram of TFE. After 3500 grams of TFE is added to the reactor, all monomer feeds are stopped, the agitator is stopped and the reactor pressure is reduced to atmospheric pressure by controlled venting of the reactor vapor space. Total reaction time as measured from the beginning of polymerization is 90.1 minutes. 9.4 kg of PFA dispersion is removed from the reactor. The dispersion contains 35.85% solids, measures pH=3 and has a raw dispersion particle size of 222 nanometers. Wet coagulum obtained from cleaning the reactor and filtering the dispersion through several layers of cheesecloth measures 300 grams. Polymer is isolated from the aqueous dispersion by freezing and thawing a representative dispersion sample. Polymer coagulated in this manor is separated from the water by filtration, is washed several times with deionized water and is dried for 16 hours in a vacuum oven at 120° C. and 23.8 inches of Hg vacuum (20.7 Pa). The TFE/PPVE (PFA) polymer has a melting point of 311° C., PPVE content of 4.1 wt % as measured by FTIR and a MFR of 1.06 gm/10 min.

Example 15 illustrates an efficient polymerization process according to this invention employing a ratio in the polymerization agent of the weight of the fluorosurfactant (DA) to the weight of said mixture of fluoropolyether acids or salts (PFPEA3) of 133:1.

What is claimed is:

1. A process comprising polymerizing at least one fluorinated monomer in an aqueous medium containing initiator and polymerization agent to form an aqueous dispersion of fluoropolymer particles, wherein said polymerization agent comprises a mixture of fluoropolyether acids or salts having a number average molecular weight of about 800 to about 2500 g/mol; wherein the amount of fluoropolyether acids or salt in said mixture having a molecular weight of not more than 500 g/mol is not more than 50 ppm by weight of the total amount of fluoropolyether acids or salts in said mixture; wherein the amount of fluoropolyether acids or salts in said mixture having a molecular weight of 2500 g/mol or greater is not more than 40% by weight of the total amount of fluoropolyether acids or salts in said mixture; and wherein the amount of fluoropolyether acids or salts in said mixture having a molecular weight of 2986.6 g/mol or greater is not more than 10% by weight of the total amount of fluoropolyether acids or salts in said mixture.

2. The process of claim 1 wherein said polymerization agent further comprises surfactant.

3. The process of claim 1 wherein said polymerization agent further comprises fluorosurfactant.

4. The process of claim 3 wherein said fluorosurfactant comprises fluoroether surfactant.

5. The process of claim 3 wherein said fluorosurfactant is a compound having the formula:

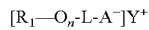

wherein:
$R_1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
$A^-$ is an anionic group selected from the group consisting of carboxylate, sulfonate, sulfonamide anion, and phosphonate; and
$Y^+$ is hydrogen, ammonium or alkali metal cation;
with the proviso that the chain length of $R_1$—$O_n$-L- is not greater than 6 atoms.

6. The process of claim 1 wherein said aqueous dispersion of fluoropolymer particles has a raw dispersion particle size of from about 10 to about 400 nm.

7. The process of claim 1 wherein said polymerizing produces fluoropolymer dispersion with a solids content of at least about 35 wt % with less than about 10 wt % undispersed fluoropolymer based on the total weight of fluoropolymer produced.

8. The process of claim 1 further comprising coagulating said fluoropolymer particles in said dispersion, removing the aqueous medium, and drying to produce dried fluoropolymer resin, said dried fluoropolymer resin having less than 250 ppm residual fluoropolyether acid or salt mixture or by-products thereof.

9. The process of claim 3 wherein the ratio in said polymerization agent of the weight of said fluorosurfactant to the weight of said mixture of fluoropolyether acids or salts is from about 2:1 to about 200:1.

10. A process comprising polymerizing at least one fluorinated monomer in an aqueous medium containing initiator and polymerization agent to form an aqueous dispersion of fluoropolymer particles, wherein said polymerization agent comprises a mixture of perfluoropolyether acids or salts of the formula:

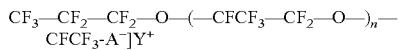

wherein $A^-$ is an anionic group selected from the group consisting of carboxylate, sulfonate, sulfonamide anion, and phosphonate; $Y^+$ is hydrogen, ammonium or alkali metal cation; wherein n is at least 1 and has an average value of about 3 to about 13; the amount of perfluoropolyether acids or salts in said mixture wherein n is 1 is not more than 50 ppm by weight of the total amount of perfluoropolyethers in said mixture; the amount of perfluoropolyether acids or salts in said mixture wherein n is 13 or greater is not more than 40% by weight of the total amount of perfluoropolyether acids or salts in said mixture; and the amount of perfluoropolyether acids or salts in said mixture wherein n is 16 or greater is not more than 10% by weight of the total amount of perfluoropolyether acids or salts in said mixture.

* * * * *